United States Patent Office 3,485,603
Patented Dec. 23, 1969

3,485,603
GASOLINE ANTI-ICING
Lawrence J. Balash, Southfield, Mich., assignor to Ethyl Corporation, New York, N.Y., a corporation of Virginia
No Drawing. Filed Apr. 7, 1967, Ser. No. 629,104
Int. Cl. C10l 1/28, 1/22
U.S. Cl. 44—63
10 Claims

ABSTRACT OF THE DISCLOSURE

Gasoline containing, as an improved anti-icing additive, the combination of an amine salt of a formaldehyde modified unsaturated organic acid and an organic silicon compound. An example of an amine salt is the N-oleyl-1,3-propylenediamine salt of the Prins reaction product obtained from formaldehyde and oleic acid. The Prins reaction involves the complex addition of the elements of formaldehyde across a carbon-to-carbon double bond. Examples of suitable organic silicon compounds are polyhydrocarbylsiloxanes (silicones) and hydrocarbyl silicates.

BACKGROUND OF THE INVENTION

The tendency of gasoline fuel internal combustion engines to stall due to carburetor icing is well known. This stalling contributes to reducing the overall efficiency of engine operation. Where the engine powers an automobile, it may also be a safety hazard.

Gasoline additives which will reduce this tendency of the carburetor to ice are available. New and improved additives, however, are always in demand.

SUMMARY OF THE INVENTION

This invention relates to the synergistic interaction of organic silicon compound and an amine salt of a formaldehyde modified unsaturated organic acid in gasoline to effect improved anti-icing characteristics. It further relates to a method of reducing the stalling due to ice formation in the carburetor of a gasoline fueled internal combusiton engine. It also relates to a combination of an organic silicon compound and an amine salt of a modified unsaturated organic acid as a new gasoline additive.

DESCRIPTION OF THE PREFERRED EMBODIMENTS

An object of this invention is to provide a gasoline composition with improved anti-icing characteristics. Another object of this invention is to provide a new gasoline additive anti-icing composition. These and other objects of this invention will be apparent from the following description and claims.

An embodiment of this invention is a gasoline containing as an anti-icing additive the combination of:

(a) a salt of
  (i) a formaldehyde modified unsaturated organic acid, said unsaturated acid having from 10 to about 20 carbon atoms and (ii) an amine having the formula

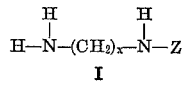

I wherein Z is selected from hydrogen and aliphatic radicals having from about 2 to about 20 carbon atoms and x is an integer from 1 to about 5 and
(b) an organic silicon compound selected from silicones and silicates.

Another embodiment is the above gasoline wherein the concentration of said salt is from about 25 to about 50 parts per million by weight and said organic silicon compound is from 5 to about 15 parts per million by weight.

A further embodiment of this invention is the gasoline described above wherein the molar ratio of formaldehyde modified acid to amine (Formula I) is 2:1.

Preferred embodiments of this invention are gasolines described above wherein the organic silicon compounds are selected from (a) silicones having the formula

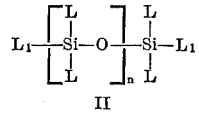

II wherein L is independently selected from $C_1$ to $C_{12}$ alkyl groups and $C_6$ to $C_{10}$ aryl groups and $n$ is an integer from 1 to about 20 and $L_1$ is selected from L as defined above and the hydroxyl group and (b) silicates having the formula

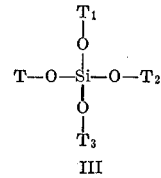

III wherein T, $T_1$, $T_2$ and $T_3$ are independently selected $C_1$ to $C_{12}$ alkyl groups. More preferred embodiments of this invention are gasolines described above wherein the organic silicon compound is a silicone having Formula IV wherein (1) L is methyl and y is 1 to about 5 and (2) L and $L_1$ are methyl and y is 1.

Especially preferred embodiments are the more preferred gasolines described above wherein said unsaturated organic acid which is formaldehyde modified, has from about 16 to about 18 carbon atoms and wherein said amine (Formula I) is a substituted 1,3-propylene diamine ($x=3$) where Z is an alkenyl radical having from about 16 to about 18 carbon atoms.

The acids which are used to prepare the salts used in the present invention are unsaturated organic acids which are reacted with formaldehyde under acid conditions. They are conveniently described in this application as formaldehyde modified unsaturated acids. This formaldehyde/acid reaction is characterized by the addition of the elements of formaldehyde across the carbon-to-carbon double bond of the acid; the product thus obtained is a mixture of various addition products; the acid function, however, is not affected. This reaction, that is, addition of elements of formaldehyde across a carbon-to-carbon double bond is commonly referred to as the Prins reaction.

Regarding this Prins reaction with an unsaturated organic acid, no definitive analysis of the products obtained appears to be available at this time. According to present knowledge, the following products are most likely to be formed when for example, oleic acid is modified with formaldehyde via the Prins reaction.

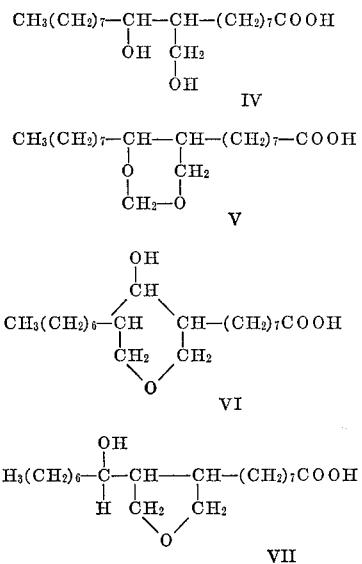

Generally, this reaction of unsaturated acid with formaldehyde is carried out in acetic acid solution with a strong acid such as sulfuric acid as the catalyst at temperatures in the region of about 50° to 115° C. A typical procedure is presented below in Example 1. When the acetic acid is the solvent, the product is also found to contain acetate esters of the adducts illustrated by Formulas IV–VII.

A thorough discussion of the Prins reaction on an unsaturated acid is found in the Journal of the American Oil Chemists Society, 43, 16–164 (1965).

Thus, the formaldehyde modified unsaturated acids used in the present invention are obtained from the addition of formaldehyde via the Prins reaction as described above.

Useful acids which are formaldehyde modified are unsaturated carboxylic acids having from about 10 up to about 20 carbon atoms. These unsaturated acids include acids having one double bond such as $\Delta^{9,10}$-decenoic acid, cetoleic acid and the like; as well as acids having more than one double bond such as linolenic acid, eleostearic acid, arachiodonic acid and the like. Preferred unsaturated acids are those having from about 16 to about 20 carbon atoms. Examples of the preferred acids are gadoleic acid, linoleic acid, palmitoleic acid, and the like. Oleic acid is a most preferred acid.

The preferred acids are commonly obtained as hydrolysis products of natural materials. The acids so obtained are usually mixtures containing other organic acids. Thus, for example, acids obtained from olive oil are typically a mixture of 83% oleic acid, 6% palmitic acid, 4% stearic acid and 7% linoleic acid. This mixture is quite suitable for preparing the formaldehyde modified acids used in this invention. In addition, the organic acid mixtures obtained on saponifying and acidulating babassu oil, castor oil, tall oil, peanut oil, palm oil and the like are also useful. Those organic acid mixtures which contain a significant proportion of oleic acid are especially useful.

Amines which are used to prepare the salts used in this invention are alkylene amines illustrated by Formula I.

These amines are characterized by having at least one primary amine group in the molecule. These amines include unsubstituted amines, that is, amines wherein Z in Formula I above is hydrogen. Examples of useful unsubstituted amines are ethylene diamine, 1,12-diaminododecane, hexamethylene diamine and the like. These amines also include the substituted amines wherein Z in Formula I above is selected from 2-aminoethyl, 2-hydroxyethyl and alkyl or alkenyl groups having up to about 20 carbon atoms. Examples of useful substituted amines are N-gadoleylethylene diamine, N-dodecyl-1,3-propylene diamine, and the like. Preferred amines are those in which Z (Formula I) is selected from alkyl or alkenyl groups (and mixtures thereof) having from about 12 to about 18 carbon atoms. Examples of these preferred amines are N-palmitoleyl-hexamethylene diamine, N-lauryl - 1,3 - propylenediamine, N -stearylethylenediamine, N-linoleyl-1,3-propylenediamine and the like. A most preferred amine is N-oleyl-1,3-propylenediamine.

The salts of the formaldehyde modified acids and amines described above are simply prepared by mixing the modified acid and the amine in the desired molar ratios at any suitable temperature. Room temperature is satisfactory. The composition of the salt will depend on the number of moles of each of the ingredients which are added. Thus, for example, salts of formaldehyde modified palmitoleic acid and ethylene diamine can be prepared where the molar ratio of the modified acid to the amine can range from up to 1:1 up to 2:1. In other words, the maximum moles of modified acid to mole of amine which can be used is equal to the total number of basic nitrogen atoms in the amine molecule. Useful salts include those in which the molar ratio of modified acid to amine ranges from 1:1 up to about 2:1. The preferred salts are those prepared from the modified acids and amines described above wherein the molar ratio of acid to amine is 2:1.

Especially preferred salts are the salt of two moles of formaldehyde modified oleic acid and one mole of N-oleyl-1,3-propylenediamine and the salt of two moles of formaldehyde modified tall oil fatty acids and one mole of N-oleyl-1,3-propylenediamine.

The preparation of a formaldehyde modified unsaturated acid and its amine salt are presented in the following examples. All parts are by weight unless otherwise indicated.

EXAMPLE 1

Preparation of formaldehyde modified fatty acid

A vessel fitted with a stirrer, a thermometer, a condenser and a dropping funnel was charged with 95 parts paraformaldehyde, 269 parts of acetic acid, and 17.6 parts of sulfuric acid. The ingredients were stirred and heated to 110° C. to dissolve the paraformaldehyde. The reaction mixture was then cooled to 88° C. 197.3 parts of a commercial tall oil fatty acid (approximately 51% oleic acid, 47% mixed linoleic acid and 2% saturated acids) were continuously added via the dropping funnel into the stirred mixture over a period of 51 minutes. During this time the temperature rose to a maximum of 96° C. The temperature when the addition of the acid was complete was 92° C. The mixture was then stirred for an additional two hours at a temperature from about 90° to about 100° C. The mixture was then cooled and about 100 grams of benzene were added to the vessel. This mixture was then stirred briefly and poured into a separatory funnel. The reaction vessel was washed out with about 35 parts of benzene. The washings were added to the separatory funnel along with an additional 150 parts of benzene. The contents of the separatory funnel were washed eight times using 200 parts of water each time. This washed product was dried over sodium sulphate for about 12 hours. The dried material was filtered and the solvent stripped under vacuum. The yield of formaldehyde/tall oil fatty acid products obtained was 273 parts. This product had an acid number of 128 mg. of KOH/g., a saponification number of 244.7 mg. KOH/g. and an iodine number of 6.8.

EXAMPLE 2

Amine salt of formaldhyde modified unsaturated organic acid

Six parts of the formaldehyde tall oil fatty acid product of Example 1 was weighed into a small vessel. 2.42 parts of N-oleyl-1,3-propylene diamine (Duomeen-O) having a base number of 316.8 mg. KOH/g. was added to this acid. The ingredients were then stirred thoroughly. 8.42 parts of the oleyl-1,3-propylenediamine salt of the Example 1 product was obtained. (Acid:amine molar ratio=2:1.) Duomeen-O is the trade name for Armour's oleyl 1,3-propylenediamine.

The procedure of Example 1 is suitable for formaldehyde modifying any of the unsaturated acids described above. In a similar manner, the salt of any of the formaldehyde modified acids can be prepared in the manner described in Example 2.

The procedure given in Examples 1 and 2 illustrate a typical method of preparing the salts of this invention. It is not intended that preparation of the modified acids and their salts be limited by these procedures. Other methods known to those skilled in the art can also be used.

The organic silicon compounds which are used in this invention are silicones having Formula II and the organic silicates having Formula III. The silicates are esters of orthosilicic acid. The silicates which are useful are the organic silicates wherein T, $T_1$, $T_2$ and $T_3$ in Formula III are hydrocarbyl groups having 1 to about 12 carbon atoms. The hydrocarbyl groups may be alkyl groups or aryl groups.

The alkyl silicates include those in which the alkyl groups are all the same as well as in which the alkyl groups are different. Examples of the former silicates are propyl silicate, dodecyl silicate, hexyl silicate, t-butyl silicate, and the like; examples of the latter silicates (which will be referred to as mixed silicates) are diethyldiisobutyl silicate, propyltripentyl silicate, ethyltriisobutyl silicate and the like. These mixed silicates are generally a mixture of mixed silicates. Thus, for example, a mixed ethyl-tert-butyl silicate would contain all the possible ethyl-tert-butyl silicate combinations. These mixtures of mixed silicates are also useful in the practice of this invention.

A preferred silicate is ethyl silicate.

Silicones used in this invention are polyalkyl- and polyarylsiloxanes. These polysiloxanes are characterized in that the silicon atom is bound directly to a carbon atom in each of two hydrocarbyl radicals and to one oxygen atom which in turn is bound to a second silicon atom. The characteristic structure is illustrated by Formula IV above.

L in Formula IV represents alkyl groups such as methyl, hexyl, dodecyl and the like, aryl groups such as phenyl and the like and mixtures thereof. $L_1$, that is, the terminal group in those polysiloxanes, can be alkyl, aryl, hydroxyl, or ester. Silicones in which L and $L_1$ methyl are preferred. These preferred silicones are also called polymethylsiloxanes or -silicones. These polymethylsilicones vary in consistency from very low viscosity waterlike fluids to thick grease-like materials. Although silicones having Formula IV are useful in general, the polymethylsiloxanes having a viscosity of from about 0.5 to about 100,000 centistokes are more preferred. Polymethylsilicone fluid having a viscosity of about 0.6 to about 1.5 centistokes is most preferred.

Another embodiment of this invention is an additive concentrate which comprises a mixture of organic silicon compounds and amine salts described above. This mixture is prepared by simply blending the two ingredients. These two ingredients may either be mutually soluble at the desired concentrations or they may not be. In the latter case, the mixture would have to be stirred prior to addition to the gasoline to insure homogeneity. On the other hand, a small amount of suitable solvent may be added to prepare a solution of the immiscible ingredients. Solvents which are useful are aromatic hydrocarbons such as toluene, xylene and the like; paraffinic hydrocarbons such as hexane, dodecane, pentadecane and the like; alcohols such as 2-ethylhexanol, pentanol, isopropanol, ethanol and the like. Commercial mixtures of solvents such as Stoddard solvent are also useful.

The ratio of the amine salt to organic silicon compound in the additive mixture concentrate may be varied. A suitable blend contains from about 60 to about 95 percent by weight of the amine salt and from about 5 to about 40 percent of the organic silicon compound. Although the ratio of the ingredients in this concentrate mixture is not critical, the ratio must be such that when added to gasoline, the concentration of organic silicon and amine salt in the gasoline is within the range taught to be effective herein.

Any gasoline suitable for use in internal combustion engines may be used in the practice of this invention. By gasoline is meant a blend of hydrocarbons boiling from about 26° C. (80° F.) to about 220° C. (430° F.) which occur naturally in petroleum and suitable hydrocarbons made from petroleum hydrocarbons made by processes such as thermal or catalytic cracking or reforming hydrocarbons and the like. Typical base gasolines are listed in Table I.

TABLE I.—BASE GASOLINES

| | A | B | C | D |
|---|---|---|---|---|
| Gravity, ° API | 59.9 | 56.6 | 62.0 | 39.7 |
| Reid Vapor Pressure, p.s.i. | 9.0 | 11.2 | 10.7 | 10.2 |
| Sulfur, percent | .013 | .007 | .054 | .050 |
| Percent Aromatics | 27.0 | 34.5 | 19.0 | 24.0 |
| Percent Olefins | 11.0 | 8.0 | 18.5 | 12.5 |
| Percent Saturates | 62.0 | 57.5 | 62.5 | 63.5 |
| ASTM Distillation, ° F.: | | | | |
| Initial B.P | 100 | 89 | 90 | 88 |
| 10% Evap | 128 | 116 | 115 | 116 |
| 30% Evap | 166 | 177 | 155 | 165 |
| 50% Evap | 210 | 230 | 199 | 218 |
| 70% Evap | 250 | 282 | 254 | 274 |
| 90% Evap | 310 | 338 | 349 | 355 |
| End Point | 396 | 410 | 420 | 432 |

Useful concentrations of the amine salts in gasolines of this invention are up to about 200 p.p.m. by weight, with 10 to about 100 p.p.m. preferred; for the organic silicon compounds, useful concentrations are up to about 100 p.p.m by weight, with 1 to about 50 p.p.m. preferred.

In preparing the improved gasolines of the present invention, the organic silicon compounds and amine salts may be conveniently added as concentrates described above. The gasoline compositions can also be prepared by simply adding the individual ingredients to the gasoline. Conventional gasoline blending procedures and apparatus can be used.

The improved anti-icing characteristics of the gasoline compositions of this invention were determined by using an automobile engine test. Briefly, the procedure consists of cycling an automobile engine with no load between medium and low speeds using cold moist carburetor intake air. When a sufficient amount of ice forms in the carburetor throttle plate and idle passages, stalling occurs during the low speed portion of the cycle. After the stall, the engine is immediately restarted on the medium speed portion of the cycle. Warm up of the engine is simulated by applying external heat to a specific section below the carburetor. The criteria for evaluating the icing tendency of a fuel is the number of stalls which occur before the warm up is accomplished. The data is reported as percent reduction in stalls using gasoline containing the additive as compared with gasoline containing no anti-icing additive. Following is a table presenting the anti-icing data for the gasoline fuels of this invention.

TABLE II.—ANTI-ICING

| Run | Gasoline Containing— | | Amount (p.p.m.)[3] | Reduction in Stalling, Percent |
|---|---|---|---|---|
| | Amine Salt | Organic Silicon | | |
| 1 | None | Dimethylsilicone [1] | 10 | 2 |
| 2 | Salt of Example 2 | None | 25 | 38 |
| 3 | do | Plus dimethylsilicone [1] | 25+5 | 54 |
| 4 | do | do | 25+10 | 67 |
| 5 | do | None | 50 | 58 |
| 6 | do | Plus dimethylsilicone [1] | 50+10 | 79 |
| 7 | None | Dimethylsilicone [2] | 10 | 11 |
| 8 | Salt of Example 2 | Plus dimethylsilicone | 25+10 | 74 |

[1] Dow Corning DC-200 Fluid, 100 centistokes (cs.).
[2] Dow Corning DC-200 Fluid, 60,000 centistokes (cs.).
[3] By weight.

The data in Table II illustrates the unexpected improvement in anti-icing obtained using the additive combinations of this invention. A small amount of 100 cs. silicone oil in gasoline has virtually no effect as an anti-icer (Run 1). The amine salt additive reduces the stalling by 38% (Run 2). Quite unexpectedly, however, the amine salt plus the silicone oil reduces stalling by 67% (Run 4). The remaining data in this table demonstrates this synergistic effect at different amine salt and silicone concentration levels as well as with silicones of higher viscosity. In each instance the improved anti-icing effect of the additive combination is striking and unexpected. This effect is quite clearly synergistic and not merely additive.

Similar anti-icing results are obtained when the following organic silicon and amine salt mixtures are used in gasoline.

| Salt of— | | (B) Organic Silicon | Concentration in gasoline (p.p.m.)[5] (A)/(B) |
|---|---|---|---|
| Acid[1] (Moles) | Amine (Moles) | | |
| $\Delta^{9,10}$-dodecenoic acid (2.0) | N-gadoleyl-1,6-hexamethylene diamine (1.0) | Dimethylsilicone 1,000 cs | 50/5 |
| Tall oil acids (2.1) | N-(2-hydroxyethyl)ethylene diamine (1.0) | Dimethylsilicone 0.60 c.s.[2] | 200/2 |
| Gadoleic acid (2.0) | N-linoleyl-1,4-butylene diamine (1.0) | Polydiphenylsilicone 10,000 cs | 100/10 |
| Linolenic acid (1.5) | 1,3 propylene diamine (1.0) | Polydiphenylsilicone 100,000 cs | 10/1 |
| Palm oil acids[3] (2.0) | N-myristyl-1,3-propylenediamine (1.0) | Dodecylsilicate | 15/15 |
| Soybean oil acids[3] (1.0) | N-palmitoleyl-1,3-propylene diamine (1.0) | Ethylsilicate | 75/30 |
| Cotton seed oil acids[3] (2.0) | N-stearyl ethylenediamine (1.0) | Tert-butylethyl[4] silicate | 30/8 |

[1] Acid is formaldehyde modified (as described herein) before making the salt.
[2] Dow Corning DC-200 Fluid.
[3] Typical acid composition is given in "Vegetable Fats and Oils" by E. W. Eckey (1954), Reinhold Publishing Co., New York.
[4] Mixture of mixed silicates.
[5] By weight.

The gasoline compositions and additive concentrates of this invention may also contain other commonly used gasoline additives. Examples of other additives are antiknock agents such as tetraethyllead, tetramethyllead, methylcyclopendadienyl manganese tricarbonyl and the like; scavengers such as ethylene bromide, ethylene chloride and the like; antioxidants such as hindered phenols and aromatic amines; lead appreciators such as tert-butylacetate and the like; corrosion inhibitors such as linoleic acid dimer and the like; and antiwear additives such as dibutylphthalate and the like; deposit modifiers such as cresyldiphenyl phosphate and the like; and dyes.

The gasoline compositions and gasoline additive mixtures of the present invention are fully described above. It is intended that the invention herein described be limited only within the lawful scope of the above disclosure and the claims which follow.

I claim:
1. A gasoline containing as an anti-icing additive the combination of
   (a) a salt of up to 200 parts per million of a
      (i) a Prins reaction product of formaldehyde and an unsaturated organic acid, said unsaturated carboxylic acid having from 10 to about 20 carbon atoms and
      (ii) an amine having the formula

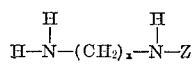

wherein Z is an aliphatic radical having from about 2 to about 20 carbon atoms and $x$ is an integer from 1 to about 5 and (b) up to 100 parts per million of an organic silicon compound selected from silicones and silicates.

2. The gasoline of claim 1 wherein the concentration of said salt is from about 25 to about 50 parts per million and the concentration of said organic silicon compound is from about 5 to about 15 parts per million, all parts by weight.

3. A gasoline of claim 1 wherein the organic silicon compound is a silicone having the formula

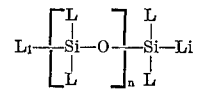

wherein L is independently selected from $C_1$ to $C_{12}$ alkyl groups and $C_6$ to $C_{10}$ aryl groups and $n$ is an integer from 1 to about 20, and $L_1$ is selected from L as defined above and the hydroxyl group.

4. The gasoline of claim 3 wherein L and $L_1$ are methyl and $n$ is 1 to about 5.

5. The gasoline of claim 3 wherein L and $L_1$ are methyl and $n$ is 1.

6. The gasoline of claim 3 wherein the acid is an unsaturated organic acid having from 16 to 18 carbon atoms wherein $x$ in the amine is 3 and Z is an alkenyl radical having from 16 to about 18 carbon atoms.

7. The gasoline of claim 1 wherein the organic silicon compound is a silicate having the formula

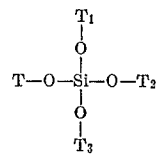

wherein T, $T_1$, $T_2$ and $T_3$ are independently selected from $C_1$ to $C_{12}$ alkyl groups.

(References on following page)

8. A gasoline additive composition comprising from about 60 to about 95 percent by weight of a salt of claim 1 and from about 5 to about 40 percent by weight of organic silicon compounds of claim 1.

9. The gasoline of claim 3 wherein said organic acid is tall oil fatty acid and said amine is N-oleyl-1,3-propylenediamine.

10. The gasoline additive composition of claim 8 wherein said organic silicon compound is the silicon of claim 3.

References Cited

UNITED STATES PATENTS

| 2,867,515 | 1/1959 | Andress | 44—66 |
| 2,996,366 | 8/1961 | Churchill et al. | 44—66 |

PATRICK P. GARVIN, Primary Examiner

Y. H. SMITH, Assistant Examiner

U.S. Cl. X.R.

44—66, 70, 76

UNITED STATES PATENT OFFICE
CERTIFICATE OF CORRECTION

Patent No. 3,485,603　　　　Dated December 23, 1969

Inventor(s)　　Lawrence J. Balash

It is certified that error appears in the above-identified patent and that said Letters Patent are hereby corrected as shown below:

Claim 1, Column 7, line 66, after the words "combination of" insert -- up to 200 parts per million of -- and delete the word "up to 200 parts per million of a" from Claim 1, Column 7, line 67. In Claim 3, Column 8, line 30, that portion of the formula reading "Si-Li" should read -- $Si-L_1$ --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents